(12) United States Patent
Forgue (10) Patent No.: US 6,993,967 B2
(45) Date of Patent: Feb. 7, 2006

(54) FLUID LEVEL SENSOR

(75) Inventor: John R. Forgue, Cheshire, CT (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 56 days.

(21) Appl. No.: 10/613,164

(22) Filed: Jul. 3, 2003

(65) Prior Publication Data

US 2004/0007061 A1 Jan. 15, 2004

Related U.S. Application Data

(60) Provisional application No. 60/395,519, filed on Jul. 12, 2002.

(51) Int. Cl.
*G01F 23/00* (2006.01)

(52) U.S. Cl. .................... 73/290 V; 73/290 R; 73/1.82; 73/1.83; 73/1.86

(58) Field of Classification Search ............... 73/290 V, 73/290 R, 1.82, 1.83, 1.86
See application file for complete search history.

(56) References Cited

U.S. PATENT DOCUMENTS

| | | | |
|---|---|---|---|
| 2,753,542 A | | 7/1956 | Rod et al. |
| 3,900,811 A | * | 8/1975 | Kurtz et al. .................... 338/2 |
| 4,090,407 A | | 5/1978 | Shuler et al. .................. 73/290 |
| 4,130,018 A | * | 12/1978 | Adams et al. ............. 73/290 V |
| 4,241,611 A | | 12/1980 | Specht et al. ................. 73/626 |
| 4,769,793 A | | 9/1988 | Kniest et al. .................. 367/99 |
| 5,095,748 A | | 3/1992 | Gregory et al. ................ 73/290 |
| 5,121,340 A | | 6/1992 | Campbell et al. ........... 364/509 |
| 5,226,320 A | | 7/1993 | Dages et al. ................... 73/290 |
| 5,309,763 A | | 5/1994 | Sinclair ........................ 73/290 |
| 5,664,456 A | * | 9/1997 | Eckert ....................... 73/290 V |
| 5,737,963 A | * | 4/1998 | Eckert et al. ............. 73/290 V |
| 5,856,953 A | | 1/1999 | Durkee .......................... 367/99 |
| 6,032,535 A | | 3/2000 | Fischer et al. ................ 73/629 |
| 6,427,532 B1 | | 8/2002 | Keller .......................... 73/290 |
| 6,588,269 B1 | * | 7/2003 | Benghezal et al. ....... 73/290 V |

* cited by examiner

*Primary Examiner*—Hezron Williams
*Assistant Examiner*—Rodney Frank
(74) *Attorney, Agent, or Firm*—Reising, Ethington, Barnes, Kisselle, P.C.

(57) ABSTRACT

An ultrasonic fluid level sensor for use in a fluid container, preferably a vehicle fuel tank. The fluid level sensor generally includes a single transceiver having measurement and reference sections, an impedance layer and a housing having a reference element and an aperture. The measurement and reference sections are independent ultrasonic transceivers that are disk-shaped and ring-shaped, respectively, and are generally concentric. The reference element is a ring-shaped portion of the housing that is axially spaced from the reference section at a known distance, and the aperture is a disk-shaped opening in the housing that is axially spaced from the measurement section. In operation, the sensor is able to provide signals to an electronic controller that enable the controller to determine a signal velocity calibrated measurement of the fluid level that is compensated for temperature, fluid composition, and other velocity affecting factors.

32 Claims, 3 Drawing Sheets

FLUID LEVEL SENSOR

REFERENCE TO RELATED APPLICATION

Applicant claims the benefit of U.S. Provisional Application No. 60/395,519, filed Jul. 12, 2002.

TECHNICAL FIELD

The present invention generally relates to fluid level sensors, and more particularly, to fluid level sensors for use in vehicle fuel tanks.

BACKGROUND OF THE INVENTION

It is known to mount a fluid level sensor in the bottom of a fluid container for purposes of measuring the fluid level. Sensors of this type often include an ultrasonic transceiver that transmits ultrasonic pulses from the bottom of the container upwards through the fluid to the fluid surface. At the fluid surface, a portion of the ultrasonic pulses are downwardly reflected back to the transceiver. The transceiver receives the reflected pulses and in response, sends a corresponding signal to an electronic controller. The controller is able to calculate the depth of the fluid by knowing the roundtrip echo time of the ultrasonic signal and the approximate velocity of the ultrasonic signal in that particular fluid. However, the velocity of ultrasonic signals in fluids may be affected by a number of variables, including the composition and temperature of the fluid.

Thus, it is also known that the accuracy of the sensor described above may be enhanced by including a reference reflector at a known distance from the transceiver. In this arrangement, some of the ultrasonic signals are purposely directed to the reflector, instead of the fluid surface, such that they reflect off of the reflector and are transmitted back to the transceiver. The sensor again sends a signal to the electronic controller that is indicative of the roundtrip echo time of these reflected signals. Because the distance to the reference reflector is precisely known, the electronic controller is able to obtain an accurate signal velocity reading for the ultrasonic signal. This calibrated velocity reading may then be used with the echo time of the ultrasonic signals reflected from the fluid surface to obtain a more accurate fluid level reading. Alternatively, some devices compensate for signal velocity variations by including one or more temperature sensors positioned within the fluid container. The temperature sensors determine the fluid temperature and send corresponding signals to the controller, such that the controller may compensate for changes in speed based on known temperature vs. velocity characteristics of that fluid.

An example of such a fluid level sensor is shown in U.S. Pat. No. 5,226,320, issued Jul. 13, 1993 to Däges et al. This patent discloses a bottom-mounted fluid level sensor that includes a main sound pulse transceiver (S1) that transmits ultrasonic signals within a waveguide, such that the signals travel from the bottom of the tank to the fluid surface. Sound pulse transceiver S1 also transmits electronic signals to a controller, where the signals correspond to the roundtrip echo times of the ultrasonic signals. Additionally, the fluid level sensor of Däges et al. utilizes first and second reference sound pulse transceivers (S2, S3) for obtaining an accurate signal velocity reading and for measuring the distance to the bottom of the tank, respectively. The first reference sound pulse transceiver S2 transmits an ultrasonic reference signal along a reference path of known length such that it reflects off of a fixed reflecting surface and back to the transceiver. Transceiver S2 then sends a signal to the electronic controller indicating the roundtrip echo time of the ultrasonic signals reflecting from the fixed reference surface such that an accurate signal velocity reading may be determined. Transceiver S3, on the other hand, reflects ultrasonic signals off of the floor of the container to determine the level of the sump boundary; that is, the level of contaminants such as water and dirt that have settled on the bottom of the tank. This fluid level sensor also includes several temperature sensors positioned at various heights throughout the container that are used to determine a mean fluid temperature. The electronic controller is programmed to calculate a temperature-corrected sound velocity based on signals from both the reference transceiver and the temperature sensors, and in turn, derives a temperature-corrected fluid height measurement. However, a fluid level sensor constructed according to the Däges et al. patent is unable to perform both transmission and reception functions for both reference and measurement signals using a single transceiver.

Other examples of fluid level sensors using ultrasonic sensors and reference reflectors are shown in the following U.S. Pat. Nos.: 6,427,532 issued Aug. 6, 2002 to Keller, U.S. Pat. No. 5,856,953 issued Jan. 5, 1999 to Durkee, U.S. Pat. No. 5,309,763 issued May 10, 1994 to Sinclair, U.S. Pat. No. 5,121,340 issued Jun. 9, 1992 to Campbell et al., U.S. Pat. No. 5,095,748 issued Mar. 17, 1992 to Gregory et al. and U.S. Pat. No. 2,753,542 issued Jul. 3, 1956 to Rod et al, to name but a few.

Though the fluid level sensors taught in the above-mentioned patents are often times capable of providing sufficient fluid level readings, there still exists room for improvement. For instance, decreasing the size and cost of the sensors, increasing their accuracy, particularly in instances where the fuel is at a very low level, where the fuel is sloshing, or where the conditions are such that it makes it difficult for measurement, are just some of the areas that present continuing challenges.

SUMMARY OF THE INVENTION

The above-noted shortcomings of prior art fluid level sensors are overcome by the fluid level sensor of the present invention, which, according to one embodiment, generally includes a single ultrasonic transceiver and a housing component. The ultrasonic transceiver has a measurement section and a reference section that are separated by an insulating section, while the housing component has a reference element and an aperture that are located at an axial end. The measurement section transmits ultrasonic measurement signals that pass through the aperture and reflect off of a fluid surface, and the reference section transmits ultrasonic reference signals that reflect off of the reference element.

According to another embodiment, the fluid level sensor of the present invention generally includes an ultrasonic transceiver, an impedance layer and a housing. The ultrasonic transceiver includes a generally disk-shaped measurement section and a generally ring-shaped reference section. The impedance layer is located adjacent the ultrasonic transceiver such that ultrasonic signals pass through the impedance layer. The housing component includes both a reference element and an aperture located at an axial end, wherein the measurement section transmits ultrasonic measurement signals that pass through the impedance layer and the aperture such that they reflect off of a fluid surface, and the reference section transmits ultrasonic reference signals that pass through the impedance layer such that they reflect off of the reference element.

According to yet another embodiment, there is provided a method for measuring the fuel level within a vehicle fuel tank that comprises the following steps: providing a fuel level sensor having ultrasonic measurement and reference sections, providing a reference element, causing the ultrasonic reference section to emit ultrasonic reference signals that reflect off of the reference element, determining the roundtrip echo time of the ultrasonic reference signals, causing the ultrasonic measurement section to emit ultrasonic measurement signals that reflect off of a surface of the fuel, determining the roundtrip echo time of the ultrasonic measurement signals, determining whether the surface of the fuel is at a level that is at or below the reference element, and if the surface of the fuel is above the reference element then determining a fuel level measurement based on the roundtrip echo times of both the ultrasonic reference and measurement signals, and if the surface of the fuel is at or below the reference element then determining a fuel level measurement based on the roundtrip echo time of the ultrasonic measurement signal and a default ultrasonic signal velocity.

According to yet another embodiment, there is provided a fluid level sensing system for use with a fluid container that includes both a fluid level sensor and an electronic controller.

Objects, features and advantages of this invention include providing a fluid level sensor for use in a fluid container that has an improved design and operation, particularly in vehicle fuel tanks experiencing low fuel levels or significant sloshing, and that is capable of reporting fluid level measurements independent of fluid temperature or composition, and is relatively simple and economical to manufacture, and has a significantly increased useful life in service.

BRIEF DESCRIPTION OF THE DRAWINGS

These and other objects, features and advantages of the present invention will be apparent from the following detailed description of the preferred embodiments and best mode, appended claims and accompanying drawings, in which:

DETAILED DESCRIPTION OF THE PREFERRED EMBODIMENTS

Figures 1, 2:
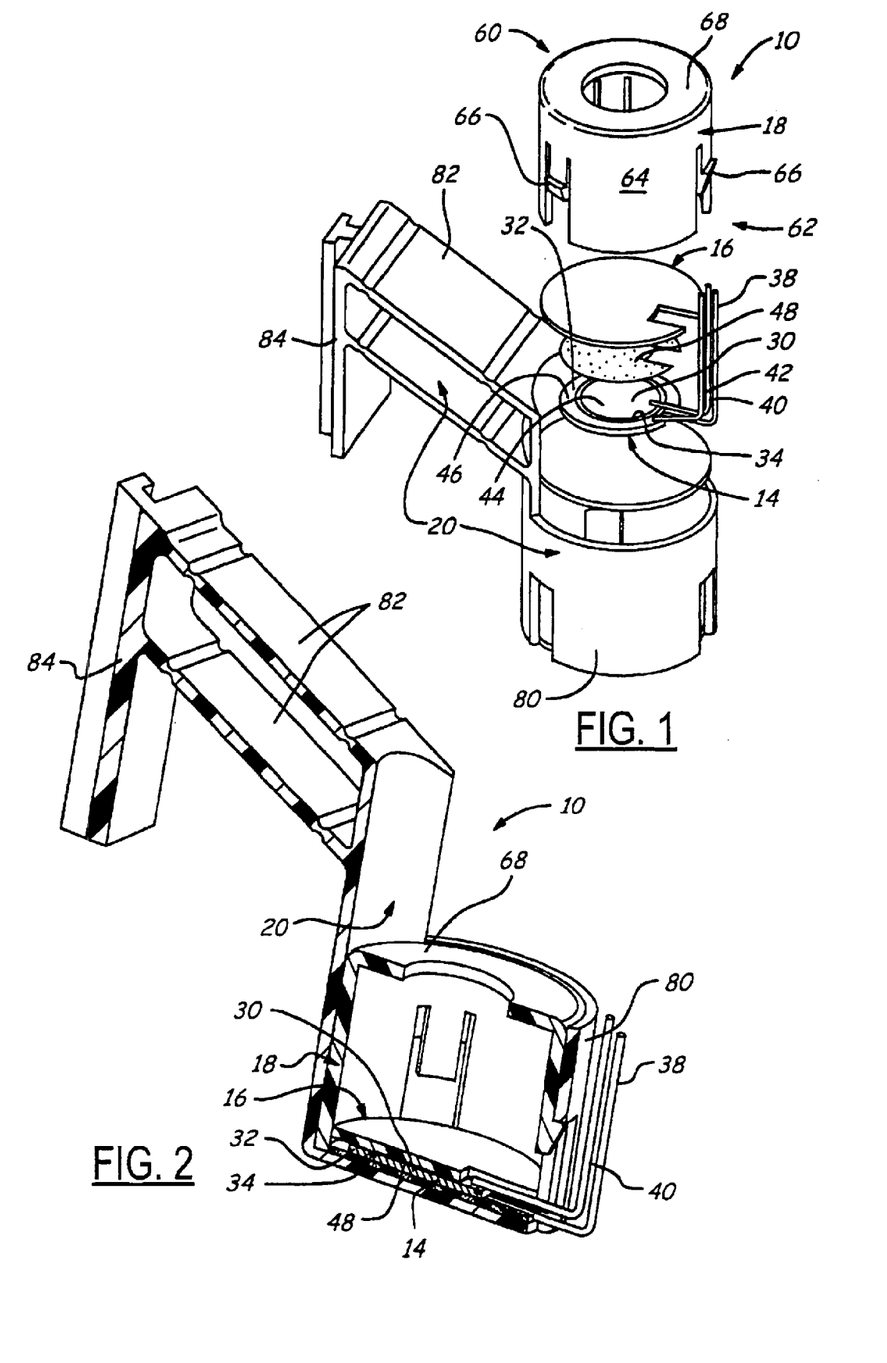
FIG. 1 is an exploded perspective view of an embodiment of the fluid level sensor of the present invention.
FIG. 2 is a cutaway perspective view of the fluid level sensor of FIG. 1.

With reference to FIGS. 1 and 2, there are shown two different views of a first embodiment of the fluid level sensor 10 of the present invention. Typically, fluid level sensor 10 is located towards the bottom of a fluid container, preferably a vehicle fuel tank, and includes a transceiver that emits ultrasonic signals upwardly into the surrounding fluid. Some of the emitted signals, referred to as measurement signals, reflect off of the fluid surface and travels back to the transceiver, such that the roundtrip echo time of the signals may be used to measure the fluid level. In order to further increase the accuracy of the sensor, some of the emitted ultrasonic signals, referred to as reference signals, are purposely directed towards and reflect off of a reference element, which is positioned a known distance from the transceiver. Because the distance and roundtrip echo time of the reference signals are known, a precise signal velocity value may be calculated. This velocity value may in turn be used with the measurement signals to further increase the accuracy of the fluid level measurement.

The fluid level sensor 10 of the present invention generally includes an ultrasonic transceiver 14, an impedance layer 16, and a housing component 18, and can be secured within a fluid container via a cup-shaped mounting bracket 20. The ultrasonic transceiver 14 is a generally disk-shaped component preferably comprised of a piezo-ceramic material, such as lead zirconate titanate (PZT). The piezo-ceramic material exhibits a phenomenon where the application of a voltage across the element can cause it to emit an ultrasonic signal in the fluid in which it is submerged. Conversely, if an ultrasonic signal traveling through the fluid strikes the piezo-ceramic element, it may cause a voltage to arise across the element. Thus, a single piezo-ceramic element may be used as both a transmitter and receiver of ultrasonic signals (transceiver), as is known in the art. Transceiver 14, though preferably formed from a single piezo-ceramic wafer, has two distinct sections: a disk-shaped measurement section 30 and a ring-shaped reference section 32, where the two sections are separated by an insulating ring 34. The insulating ring 34 electrically isolates the measurement section 30 from the reference section 32 such that they may be individually and separately excited.

Figure 3:
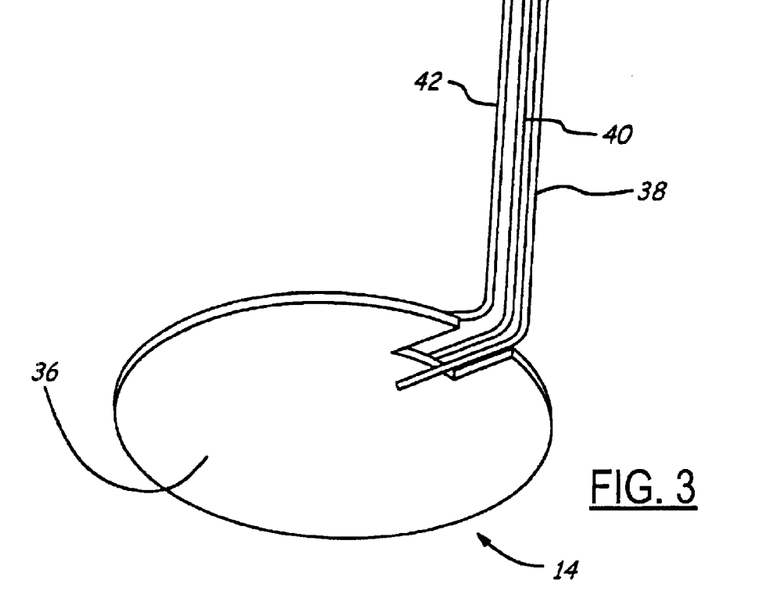
FIG. 3 is a perspective view of the underside of an ultrasonic transceiver of the fluid level sensor of FIG. 1.

Both upper and lower surfaces of the transceiver are metalized; that is, they are coated with a thin layer of electrically conducting metal, such as silver or nickel, that is in contact with one or more electrical leads. The entire lower or underside surface of the transceiver, which is seen in FIG. 3, is coated with a single, unbroken metalized layer 36, such that a common ground lead 38 may extend underneath the transceiver and be in electrical communication with all areas of the transceiver, including both the measurement and reference sections. The upper or topside surface of the transceiver, on the other hand, includes two metalized layers: an inner disk-shaped metalized layer 44 that corresponds to measurement section 30 and is in contact with a positive electrical lead 40, and an outer ring-shaped metalized layer 46 that corresponds to reference section 32 and is in contact with a positive electrical lead 42. These two metalized layers are electrically isolated from one another by the narrow non-metalized insulating ring 34. In the preferred embodiment, insulating ring 34 is simply an annular section of the transceiver that does not include a metalized layer, however, it is possible to actually coat the surface of the insulating ring 34 with a non-conducting material in order to further isolate the measurement and reference sections. Preferably, the metalized layers 44, 46 and the insulating ring 34 are coaxial or concentric. Positive leads 40 and 42 are connected to and extend from the inner and outer metalized layers through a notch formed in an outer circumference of the transceiver. Excitement of the piezo-ceramic material by either electrical lead 40 or 42 causes the transceiver to emit an ultrasonic signal upwards, such that it passes through impedance layer 16.

The impedance layer 16 is a thin disk-shaped component that is located between the transceiver and the surrounding fluid and acts as an impedance matching layer for improved ultrasonic wave transmission. The greater the difference in the ultrasonic signal velocity between two mediums, the greater the amount of signal reflection at the boundary between those mediums. Thus, if transceiver 14 were to directly couple ultrasonic signals into the surrounding fluid, there could be a significant amount of reflection at that interface due to the significant difference in signal velocity characteristics of those mediums. This is obviously an undesirable situation. Thus, in order to successfully couple the ultrasonic signals from the transceiver to the fluid with as little reflection as possible, the impedance layer 16 is placed in between them. The impedance layer conducts ultrasonic signals at a velocity that is between the velocity conducted by the transceiver and the velocity conducted by the fluid, thus a more gradual change in the speed of the ultrasonic signals exits at both the transceiver/impedance interface and the impedance/fluid interface, than would be if the signals were transmitted directly from the transceiver to the fluid. A lower surface of the impedance layer 16 is bonded to the upper metalized surface of the transceiver 14 by means of an adhesive, such as EC A316 adhesive, which is used to form a thin bonding layer 48. Preferably, the impedance layer 16 has a thickness of approximately ¼ of an ultrasonic wavelength, however, alternative impedance matching materials and thicknesses could also be used.

Housing component 18 is a hollow cylindrical-shaped component that is generally open at both upper and lower axial ends 60, 62, and generally includes a main cylindrical body 64, attachment features 66 and a ring-shaped reference element 68. Preferably, the housing component is comprised of polyphenylene sulfide (PPS) and has walls that are approximately 20 mm thick, but in other embodiments it could be made of other suitable materials and could vary in thickness. The lower axial end 62 is completely open such that the housing component may slip over top of both the transceiver 14 and impedance layer 16, thereby providing protection and signal isolation to those components. The upper axial end 60, however, carries the ring-shaped reference element 68 and is therefore only partially open. The reference element 68 surrounds a circular aperture in the upper axial end 60, and is designed to reflect the signals emitted by reference section 32 of the transceiver. More specifically, reference element 68 has a ring-shape that is equivalent to that of the reference section 32 (albeit that reference element 68 may be slightly larger than reference section 32), and reference element 68 is positioned vertically above the reference section 32. Thus, the majority of ultrasonic signals emitted by reference section 32 strike the underside of reference element 68 and are reflected back to the reference section. The precise geometry, size and surface contours of the reference element 68 may, of course, vary from the preferred embodiment taught herein. As seen in the drawings, the main cylindrical body 64 has several attachment features 66 located at different circumferential positions around the body. Each attachment feature includes a barb-shaped component that is biased such that it may connect with a complimentary opening in the mounting bracket 20, such attachment features being commonly understood. Furthermore, attachment feature 66 also includes a cutout or opening in the main body 64 which provides access for electrical leads 38–42. When assembled, the fluid level sensor 10 forms a small, compact assembly that may be easily installed within a fluid container. The sensor 10 may be attached to the container by the mounting bracket 20.

Mounting bracket 20 securely receives the fluid level sensor 10 and attaches that sensor to an interior wall of the fluid container or to some other interior component, such as a fuel sender unit. The mounting bracket is preferably formed of an acetal compound and generally includes a cup-shaped retaining element 80, a linkage component 82 and an attachment feature 84. As best shown in FIG. 2, the exterior diameter of housing component 18 is only slightly less than the interior diameter of the cup-shaped retaining element 80 such that the housing component is tightly received by the retaining element. When the fluid level sensor is inserted into the retaining element 80, a small gap exists between the lower surface metalized layer 36 of the ultrasonic transceiver and a floor panel or closed lower axial end of the retaining element 80. This gap is preferably filled with a nitrile foam damping pad 86 that decouples the underside surface of the ultrasonic transceiver from the fluid. This enhances signal transmission from the upper surface of the transceiver and reduces any echo that might otherwise have been downwardly transmitted from the lower surface metalized layer 36. Retaining element 80 is integrally formed with the linkage component 82, which is preferably formed as a set of support arms arranged in the form of a parallelogram. The linkage component is designed to support the fluid level sensor 10, and more particularly the ultrasonic transceiver 14, in a disposition that is parallel to the fluid surface (assuming the fluid surface is not at an incline) and spaced from a bottom surface or floor of the container. Furthermore, the linkage component 82 is preferably biased downward, such that it maintains the underside of the cup-shaped retaining element 80 against the bottom surface of the fluid container. In this particular embodiment, the downward plastic bias is accomplished by a set in the plastic linkage component 82, however, in other embodiments the linkage may be comprised of metal and may include a separate spring or other biasing element. In still other embodiments, the fluid level sensor 10 and/or the mounting bracket 20 may be configured such that they are fixed directly to the bottom surface of the fluid container or tank by welding or other known means.

Figure 4:
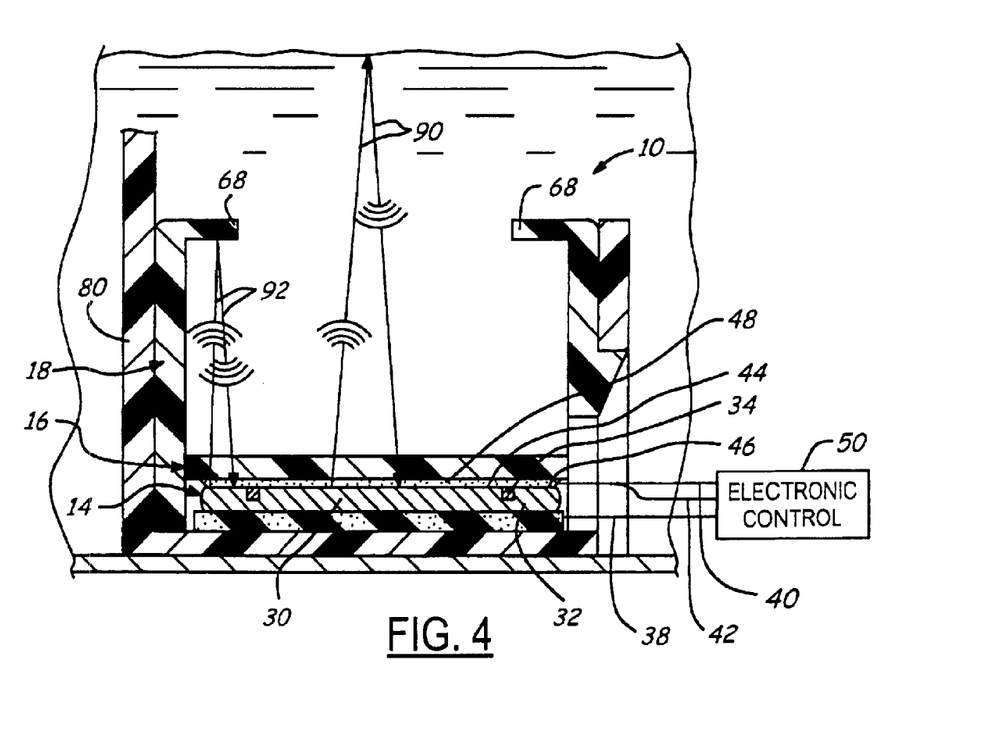
FIG. 4 is a cutaway view of the fluid level sensor of FIG. 1 showing the sensor in operation.

With specific reference to FIG. 4, the general operation of the fluid level sensor 10 will now be described. An electronic controller 50 directs transceiver 14 to emit ultrasonic signals into the surrounding fluid such that some of those signals reflect off of the fluid surface (measurement signals 90) and some of those signals reflect off of the underside of reference element 68 (reference signals 92). The fluid level sensor 10, in turn, provides signals to controller 50 which allow it to use the roundtrip echo times of both the measurement and reference signals to determine a signal velocity-calibrated fluid level measurement. First, the controller excites either the measurement section 30 or the reference section 32 of the transceiver. Preferably, these sections are not excited simultaneously, rather, they are excited sequentially. If the reference section is excited first, then positive lead 42 is provided with a voltage signal, hereafter referred to as the "reference transmission signal", which is applied to the ring-shaped metalized layer 46. The reference transmission signal is the electronic signal from the controller to the fluid level sensor, and more particularly the ultrasonic transceiver 14 that causes the reference section to become excited and emit ultrasonic signals 92. The reference transmission signal causes reference section 32 to upwardly emit ultrasonic signals 92 into the fluid such that they pass through the bonding and impedance layers 48, 16 and travel approximately the axial length of the housing component 18, at the end of which, they are reflected by the underside of the reference element 68. This reflection sends signals 92 back through the bonding and impedance layers 48, 16 to the reference section 32 such that they strike that section, thereby causing the transceiver to generate an electronic signal, hereafter referred to as the "reference reception signal". The reference reception signal is the electronic signal from the fluid level sensor, and more particularly the ultrasonic transceiver 14, to the controller which is transmitted via lead 42 and indicates when a reflected ultrasonic signal 92 has impinged the reference section 32. As will be subsequently explained in greater detail, the controller is able to use the roundtrip echo time of the reference signal 92, which is simply the time between when the reference transmission signal was sent and when the reference reception signal was received, as well as the known axial distance from reference section 32 to the underside of reference element 68, to determine the precise velocity of the ultrasonic signals in that particular fluid.

Assuming the measurement section 30 is excited first, positive lead 40 is provided with a voltage signal, hereafter referred to as the "measurement transmission signal", which is applied to the disk-shaped metalized layer 44. The measurement transmission signal is the electronic signal from the controller to the fluid level sensor, and more particularly the ultrasonic transceiver 14 that causes the measurement section to become excited and emit ultrasonic signals 90. As previously mentioned, energization of either the reference or the measurement sections does not cause a corresponding energization of the other section, as they are isolated from each other via insulating ring 34. This allows for independent energization of the measurement and reference sections 30, 32. The measurement transmission signal causes measurement section 30 to upwardly emit ultrasonic signals 90 through both the bonding and impedance layers 48, 16 and into the fluid such that they travel approximately the axial length of the housing component 18, at the end of which, they exit the fluid level sensor via the aperture in the upper axial end 60. The measurement signals 90 continue traveling upwardly until the reach the fluid level surface, which in the case of a vehicle fuel tank, is the boundary between the fuel and the vapors located within the tank above the liquid fuel. This boundary causes a reflection of a majority of the ultrasonic signals 90, such that they are reflected back down toward the fluid level sensor. At least some of the reflected ultrasonic signals 90 pass once again through the aperture in upper axial end 60 as well as the impedance and bonding layers 16, 48, such that they impinge the measurement section 30 thereby causing the transceiver to generate an electronic signal, hereafter referred to as the "measurement reception signal". The measurement reception signal is the electronic signal that is sent from the fluid level sensor, and more particularly the ultrasonic transceiver 14, to the controller which indicates when an ultrasonic signal reflected from the fluid surface has impinged the measurement section 30. The measurement reception signal is sent from the sensor to the controller via a conductor such as lead 40. Again as will be subsequently explained in greater detail, the controller 50 is able to use the roundtrip echo time of the measurement signal 90, which is the time between when the measurement transmission signal was sent and when the measurement reception signal was received, as well as the ultrasonic signal velocity calculated from the reference signal 92 and the known distance to the reference element 68, to determine the precise fluid level in that container.

Figure 5:
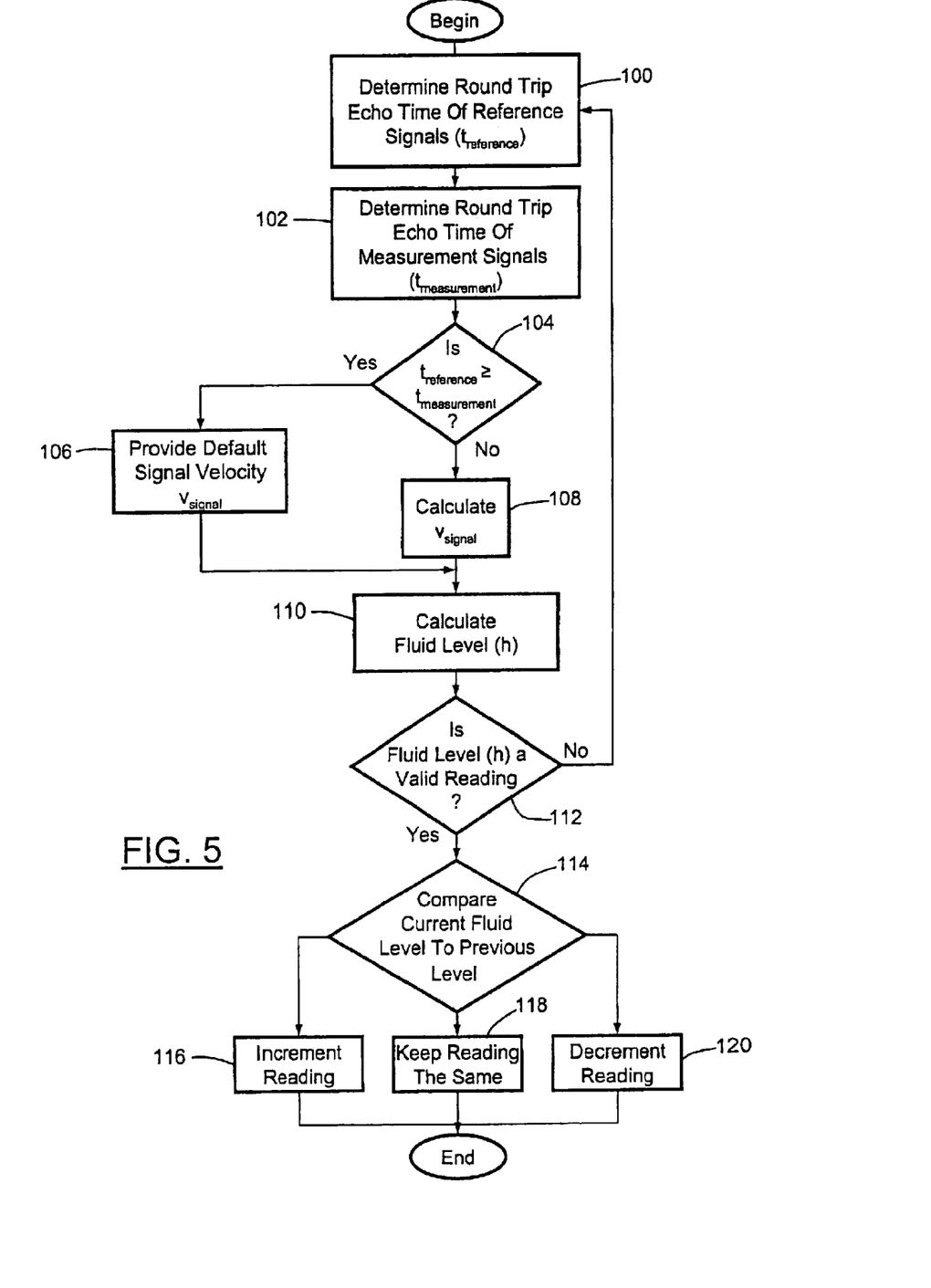
FIG. 5 is a flowchart that shows the general operation of fluid level sensor of the present invention.

The previous description of the fluid level sensor of the present invention was simply a description of a preferred embodiment, and thus, numerous alternative embodiments also exist. For instance, impedance layer 16 could be integrally formed with the housing component 18, such that it is a single component. In such an arrangement, both the impedance layer and the housing component are made from the same material and are integrally connected to one another at an interior surface of the housing component. According to another alternative embodiment, the disk-shaped measurement section 30 and ring-shaped reference section 32 could be formed from separate transceiver components. Stated differently, the measurement and reference sections could be formed such that they are not simply two sections of a single piezo-ceramic material, but rather are formed from two separate and independent piezo-ceramic elements all together. According to yet another alternative embodiment, the housing component 18 and/or the retaining element 80 could be square or rectangular in cross-sectional shape, as opposed to being cylindrical. According to yet another alternative embodiment that involves the operation of the fluid level sensor 10, the measurement section 30 could be excited first, before excitation of the reference section 32. These are just a few examples of alternatives to the preferred embodiment that was previously discussed. Turning now to FIG. 5, a more comprehensive explanation of the signal processing executed by electronic controller 50 is provided.

The electronic controller includes circuitry that calculates the fluid level within a fluid container, such as a vehicle fuel tank, based on the roundtrip echo times of the ultrasonic measurement and reference signals, thereby compensating for factors that influence signal velocity, such as fluid temperature and composition. The electronic controller 50 generally includes an application specific integrated circuit (ASIC) comprising controller logic and drive components which interface with a generic microcontroller, such as a Microchip 16F873 model. In such an arrangement, the electronic controller 50 may easily be connected to an existing controller which may be part of a larger overall system. FIG. 5 shows a general overview of a preferred sequence of steps, which together calculate a single "valid" fluid level reading. Often times, fluid level sensors, such as that of the present invention, will require upwards of 40% of the fluid level readings to be valid in order to consistently provide accurate results. Thus, the preferred sequence of steps shown in FIG. 5 will be repeated numerous times at a particular sampling rate, such as 50 times/sec.

The preferred sequence begins with step 100, which determines the roundtrip echo time of the reference signals 92. First, the electronic controller sends the reference transmission signal, as previously described, to the reference section 32 of the ultrasonic transceiver via lead 42. This causes reference section 32 to upwardly transmit the ultrasonic reference signal 92 into the surrounding fluid. Once reference signal 92 reflects off of the underside of the reference element 68, it returns to and strikes the reference section 32, which causes that section to send a reference reception signal to the controller, as previously discussed. The controller is able to derive the roundtrip echo time ($t_{reference}$) for the reference signal by determining the amount of time that lapsed between sending the reference transmission signal and receiving the reference reception signal. Similarly, the controller executes step 102 which determines the roundtrip echo time of the measurement signals 90. The electronic controller sends the measurement transmission signal to the measurement section 30 of the ultrasonic transceiver via lead 40, which causes that section to upwardly transmit the ultrasonic measurement signal 90 into the surrounding fluid. The ultrasonic measurement signal reflects off of the fluid level surface and travels back to the measurement section 30, where upon its return, the measurement section sends a measurement reception signal to the controller. The controller calculates the roundtrip echo time ($t_{measurement}$) of the measurement signals 90 by determining the amount of time that lapsed between sending the measurement transmission signal and receiving the measurement reception signal. By initiating the ultrasonic reference and measurement signals sequentially, as opposed to simultaneously, the chances of ultrasonic signals from one transceiver section interfering with the other section is reduced. It should be recognized, however, that the particular order of steps 100 and 102 could be reversed such that the roundtrip echo time ($t_{measurement}$) of the ultrasonic measurement signals are determined first. Once these echo times have been determined, step 104 checks to make sure that $t_{reference}$ is a valid reading.

Step 104 is used to identify cases where the fluid level is at or has fallen below the reference element 68, in which case, calculating a signal velocity ($V_{signal}$) from $t_{reference}$ could produce invalid results. This is because the ultrasonic reference signals 92 would be reflecting from the low fluid surface and the not the reference element 68 which is spaced at a known distance from the transceiver. First, step 104 determines whether or not preference is greater than or equal to $t_{measurement}$. During low fluid situations where the fluid level within housing component 18 is below the reference element 68, $t_{reference}$ and $t_{measurement}$ are approximately equal. If the answer to step 104 is "yes", then the fluid level is too low to use $t_{reference}$ and a default signal velocity is provided in step 106. The default signal velocity can either be some predetermined default value, for instance the velocity of ultrasonic signals in fuel at a common fuel tank fluid temperature, or the default signal velocity could be the last validly calculated velocity value. These, of course, are only two examples of sources of default $V_{signal}$ values, as others exist. If the answer to step 104 is "no", then the fluid level is sufficiently above the reference element 68, such that $V_{signal}$ may be calculated in step 108. As is known in the art, the ultrasonic signal velocity may be calculated by the following equation:

$$V_{signal} = d_{reference}/t_{reference}$$

where $d_{reference}$ is the total known distance between the reference section 32 of the transceiver and reference element 68 and back, and $t_{reference}$ is the roundtrip echo time of the ultrasonic reference signal 92. Because the distance from reference section 32 to reference element 68 is fixed and known, the controller is able to determine and take into account the degree to which variables such as fluid temperature and composition are affecting the velocity of the ultrasonic signals in the fluid. Now that the electronic controller has a value for $V_{signal}$, regardless of whether it was derived from step 106 or step 108, the controller is able to determine the fluid level or height in the container.

Step 110 calculates the fluid level or height in the container by using the $V_{signal}$ and $t_{measurement}$ values. This calculation is may be accomplished by the following:

$$h = (V_{signal} * t_{measurement})/2$$

where (h) is the fluid level or height within the fluid container. Typically, the controller 50 reports the fluid level readings to a display. In automotive applications, the display is generally located within a passenger compartment, such as on an instrument panel. However, the controller will not report a fluid level reading that falls outside a predetermined window of acceptable values; a value referred to as an "invalid" reading.

Step 112 makes sure that the calculated fluid level is within an acceptable range for that particular fluid container, and thereby only reports "valid" readings. A "valid" reading is one that falls within a predetermined range of all of the possible readings for that container. For example, if the fluid level sensor 10 is mounted within a tank that is 200 mm tall, the controller will not report a fluid level measurement (h) that states that the current fluid level is 250 mm above the ultrasonic transceiver. When the controller receives invalid readings, it simply ignores the invalid reading and returns operation to step 100, which has the effect of maintaining the most recent valid reading. Accordingly, the controller continues reporting the last valid reading until a new valid reading is received. Of course, control of the operation could alternatively return to step 102 instead of step 100, if one wants to avoid taking the reference signal reading again.

In order to compensate for sloshing and other movement of the fluid, step 114 only allows the reported fluid level (h) to change at a certain rate, which has the effect of providing a more gradual and smooth change in the fluid level readings. The controller accomplishes this type of filtering by comparing the newly calculated or current fluid level reading with stored values of the fluid level reading. If the current reading exceeds the stored reading, then step 116 increments the reported fluid level by a predetermined step value, if the current reading is equal to the stored reading, then the reported fluid level reading remains the same, and if the current reading is less than the stored reading, then step 120 decrements the reported fluid level reading by a predetermined step value. Of course, the predetermined step value for incrementing and decrementing does not have to be the same. This is particularly true in instances where, for example, a fuel tank can be filled by an operator (involves increment step value) at a faster rate than it can be emptied during operation (involves decrement step value). Furthermore, the specific parameters used in steps 114–120 can be adjusted to meet the particular needs of the application in which the fluid level sensor 10 is used.

Again, FIG. 5 simply represents a preferred sequence of steps and could vary from the order and details of those steps specifically shown. Moreover, additional steps performing additional features could easily be added. For example, the controller could use the signal velocity calculation $V_{signal}$ and stored look up tables, such as those containing information relating signal velocities in fluid at different temperatures, to approximate the actual temperature of the fluid. This approximation requires an assumption as to the type of fluid being measured. In the case of an automotive fuel tank application, the controller is programmed to assume unleaded gasoline in a gasoline-operated vehicle and diesel fuel in a diesel-operated vehicle.

Also, additional provisions could be taken to account for power-up, power failure, as well as unforeseen situations. For example, the controller could be designed to continuously store the last valid fluid level reading. This way, in the event that during the first pass through the sequence of steps of FIG. 5 following an initial power-up, if the sensor 10 fails to provide a valid fluid level reading, the controller may use the last stored valid reading. Non-volatile random access memory (NVRAM) may be used as the memory device to accomplish this. Any one of a number of different alternative methods may be used to store this measurement information, including the three following methods that help decrease the number of write cycles to the NVRAM: i) storing reduced accuracy numbers, ii) storing current data only when the power drops below a specified value, and iii) storing data into separate locations in the NVRAM.

The first method involves storing a new fluid level reading only when the current reading varies from the last stored reading by at least a predetermined amount. This technique limits the number of writes to the NVRAM, which may be important when the NVRAM components have a limited write life. The second method involves the controller storing the last fluid level reading at full accuracy just before power-off. For this method to work, the ultrasonic transceiver must have enough locally stored energy to successfully take a reading and store that reading in NVRAM after the vehicle power has been removed. The third method involves storing fluid level readings in separate locations in the NVRAM using a parity bit. Information continues to be written to the two locations until one is found to be bad. When one of the locations is found to be bad, that address is marked as being bad and is no longer used. Instead, a different location of the NVRAM is used to store the next set of data. In this way, the complete NVRAM can be stepped through its maximum storage cycles serially. Because typical NVRAM devices have 64+ locations, this method may extend the write cycle limit of a individual location by approximately 60 times.

The previous description is intended to illustrate certain embodiments of the present invention rather than limit the present invention. Therefore, it uses descriptive rather than limiting words. However, it is possible to modify this invention from the specific disclosure provided herein. For instance, step 104 could be modified such that a default signal velocity value would be used if the roundtrip echo time of the reference signal was within a certain amount of time of the roundtrip echo time of the measurement signal, instead of specifically having to be greater than or equal to. This would account for small inaccuracies in the ultrasonic transceiver sections. Also, it is possible to mount the fluid level sensor of the present invention above the fluid such that it emits ultrasonic measurement and reference signals downwards towards the fluid surface. In such a case, the ultrasonic reference signals would measure the velocity of the ultrasonic signals as they passed through the medium located above the fluid, typically some type of vapor mixture. Thus, by knowing the overall height of the fluid container and the calibrated distance to the top of the fluid surface, it would be possible to determine the height of the fluid within the container. Of course, additional features could be added to this embodiment to account for situations where the fluid has been filled to a height that is above the reference element, etc. Various changes and modifications will become apparent to those skilled in the art and all such changes and modifications are intended to be within the scope of the present invention.

What is claimed is:

1. A fluid level sensor for use in a fluid container, comprising:
   a single ultrasonic transceiver having a measurement section and a reference section separated by an insulating section, said measurement and reference sections each being able to both transmit and receive ultrasonic signals,
   a housing component having both a reference element and an aperture axially spaced from said ultrasonic transceiver, said measurement section transmits ultrasonic measurement signals that pass through said aperture to reflect off of a fluid surface, and said reference section transmits ultrasonic reference signals that reflect off of said reference element, and
   a mounting bracket having a linkage component for maintaining said ultrasonic transceiver in a generally parallel disposition to a fluid surface.

2. The fluid level sensor of claim 1, wherein said measurement section and said aperture are disk-shaped, said reference section and said reference element are ring-shaped, and all of which are generally concentric.

3. The fluid level sensor of claim 2, wherein said measurement section is located beneath said aperture such that a portion of said ultrasonic measurement signals pass through said aperture, and said reference section is located beneath said reference element such that a portion of said ultrasonic reference signals reflect off of an underside of said reference element.

4. The fluid level sensor of claim 1, wherein said measurement section includes a metalized layer electrically connected to a first electrical lead, and said reference section includes a metalized layer electrically connected to a second electrical lead.

5. The fluid level sensor of claim 4, wherein energization of said first electrical lead causes said measurement section to transmit said ultrasonic measurement signals, and energization of said second electrical lead causes said reference section to transmit said ultrasonic reference signals.

6. The fluid level sensor of claim 1, wherein said ultrasonic transceiver is comprised of a piezo-ceramic composition.

7. The fluid level sensor of claim 1, wherein said fluid level sensor further includes an impedance layer located between said ultrasonic transceiver and the surrounding fluid.

8. The fluid level sensor of claim 7, wherein an upper surface of said ultrasonic transceiver is bonded to a lower surface of said impedance layer.

9. The fluid level sensor of claim 1, wherein said fluid level sensor further includes a damping pad located beneath said ultrasonic transceiver.

10. The fluid level sensor of claim 1, wherein said mounting bracket further includes a retaining element that is cup-shaped and is closed at a lower axial end and open at an upper axial end such that it may receive said housing component.

11. The fluid level sensor of claim 1, wherein said linkage component includes one or more linkage arms that are biased such that said fluid level sensor is maintained against the bottom of the fluid container.

12. The fluid level sensor of claim 1, wherein said sensor is a fuel level sensor for use in a vehicle fuel tank.

13. The fluid level sensor of claim 12, wherein said mounting bracket is mounted to a fuel sender unit.

14. The fluid level sensor of claim 12, wherein said mounting bracket is mounted to the fuel tank.

15. The fluid level sensor of claim 1, wherein said fluid level sensor is coupled to an electronic controller such that said controller is capable of providing a reference transmission signal and a measurement transmission signal to said sensor that causes said sensor to transmit said ultrasonic reference signals and said ultrasonic measurement signals, respectively, and wherein said fluid level sensor is capable of providing a reference reception signal and a measurement reception signal to said controller upon reception of said ultrasonic reference signals and said ultrasonic measurement signals, respectively.

16. The fluid level sensor of claim 15, wherein said controller is capable of determining the velocity of said ultrasonic reference signals by using the time difference between when said reference transmission signal was sent and when said reference reception signal was received.

17. The fluid level sensor of claim 16, wherein said controller is capable of determining a velocity-corrected fluid level measurement by utilizing the velocity calculation of claim 16 and the time difference between when said measurement transmission signal was sent and when said measurement reception signal was received.

18. A method for measuring the fuel level within a vehicle fuel tank, comprising the steps of:

(a) providing a fuel level sensor having ultrasonic measurement and reference sections, (b) providing a reference element located at a known distance from said ultrasonic reference section, (c) causing said ultrasonic reference section to emit ultrasonic reference signals that pass through the fuel to reflect off of said reference element, (d) determining the roundtrip echo time of said ultrasonic reference signals, (e) causing said ultrasonic measurement section to emit ultrasonic measurement signals that pass through the fuel to reflect off of a surface of the fuel, (f) determining the roundtrip echo time of said ultrasonic measurement signals, (g) determining whether the surface of the fuel is at a level that is at or below said reference element, and (h) if the surface of the fuel is above said reference element then determining a fuel level measurement based on the roundtrip echo times of both said ultrasonic reference and measurement signals, and if the surface of the fuel is at or below said reference element then determining a fuel level measurement based on the roundtrip echo time of said ultrasonic measurement signal and a default ultrasonic signal velocity.

19. The method of claim 18, wherein said default ultrasonic signal velocity is based upon a predetermined fixed velocity value.

20. The method of claim 18, wherein said default ultrasonic signal velocity is based upon the last calculated velocity value that was valid.

21. The method of claim 18, wherein said fuel level measurement must fall within a range of predetermined values.

22. The method of claim 18, wherein said ultrasonic reference signals are emitted sequentially with respect to said ultrasonic measurement signals.

23. The method of claim 18, wherein said method further comprises the steps of:

(i) storing said fuel level measurement, (j) determining a second fuel level measurement, and (k) if said second measurement is greater than said stored measurement then incrementing said stored measurement by a predetermined step value, if said second measurement is equal to said stored measurement then keeping said stored measurement the same, and if said second measurement is less than said stored measurement then decrementing said stored measurement by a predetermined step value.

24. The method of claim 23, wherein said predetermined step values for incrementing and decrementing are unequal.

25. The method of claim 18, wherein said method further comprises the step of determining the signal velocity of said ultrasonic reference signal by using said roundtrip echo time of said ultrasonic reference signals and said known distance between said ultrasonic reference section and said reference element.

26. The method of claim 25, wherein said method further comprises the step of determining the temperature of the fuel by using said signal velocity.

27. The method of claim 18, wherein said method further comprises the step of continuously storing said fuel level measurement such that if power is removed, the last stored measurement may be reported.

28. The method of claim 27, wherein said fuel level measurement is stored by using a technique that reduces the number of write cycles to a non-volatile memory device.

29. A fuel level sensor assembly for use in a fuel tank having a fuel sender unit, comprising:

an ultrasonic transceiver having a measurement section and a reference section that are each able to both transmit and receive ultrasonic signals, a housing component having both a reference element and an aperture axially spaced from said ultrasonic transceiver, said measurement section transmits ultrasonic measurement signals that pass through said aperture to reflect off of a fuel surface, and said reference section transmits ultrasonic reference signals that reflect off of said reference element, and a mounting bracket having a cup-shaped retaining element for receiving said housing component, a linkage component, and an attachment feature for attaching said fuel level sensor assembly to the fuel sender unit, wherein said linkage component helps maintain said ultrasonic transceiver in a generally parallel disposition to the fuel surface.

30. A fluid level sensor system for use with a fluid container, comprising:

an ultrasonic transceiver having a measurement section capable of providing an electronic signal in response to receiving an ultrasonic signal, and a reference section also capable of providing an electronic signal in response to receiving an ultrasonic signal, a housing component having a reference element located at a known position such that it reflects some ultrasonic signals towards said reference section, and an electronic controller coupled to said ultrasonic transceiver for receiving said electronic signals, wherein if said ultrasonic transceiver provides said electronic controller with an electronic signal indicating that the surface of the fluid is at or below said reference element, then said electronic controller utilizes a default ultrasonic signal velocity to determine a fluid level measurement.

31. The system of claim 30, wherein said default ultrasonic signal velocity is based upon a predetermined fixed velocity value.

32. The system of claim 30, wherein said default ultrasonic signal velocity is based upon the last calculated velocity value that was valid.

* * * * *